United States Patent
Pflug

(10) Patent No.: US 6,273,616 B1
(45) Date of Patent: Aug. 14, 2001

(54) MOUNTING ARRANGEMENT FOR A SHAFT

(75) Inventor: Rainer Pflug, Heilsbronn (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/452,694

(22) Filed: Dec. 2, 1999

(30) Foreign Application Priority Data

Dec. 21, 1998 (DE) .............................. 198 58 996

(51) Int. Cl.$^7$ .............................. F16C 33/58; F01C 1/02
(52) U.S. Cl. ..................... 384/564; 384/447; 384/569; 418/55.1
(58) Field of Search ................... 384/564, 569, 384/559, 560, 584, 447; 418/55.1, 55.5

(56) References Cited

U.S. PATENT DOCUMENTS

| | | | |
|---|---|---|---|
| 4,869,604 | * | 9/1989 | Hill ..................... 384/569 |
| 4,940,395 | * | 7/1990 | Yamamoto et al. ....... 418/55.1 X |
| 4,955,732 | * | 9/1990 | Behrens ................ 384/564 X |
| 5,297,509 | * | 3/1994 | Murphy ................. 384/569 X |
| 6,116,876 | * | 9/2000 | Kitano ................. 418/55.1 X |

FOREIGN PATENT DOCUMENTS

| | | |
|---|---|---|
| 1453475 | 2/1969 | (DE) . |
| 4204631 | 10/1992 | (DE) . |
| 4238147 | 5/1994 | (DE) . |
| 19732478 | 1/1998 | (DE) . |
| 19636508 | 3/1998 | (DE) . |
| 19709777 | 9/1998 | (DE) . |
| 19711557 | 9/1998 | (DE) . |

* cited by examiner

*Primary Examiner*—Thomas R. Hannon
(74) *Attorney, Agent, or Firm*—Bierman, Muserlian and Lucas

(57) ABSTRACT

The invention concerns an arrangement for mounting a shaft (1) comprising a shaft journal (8) arranged eccentric to a central longitudinal axis (7) of the shaft (1) on an end portion (6) of the shaft (1), said end portion (6) being supported by a first needle roller bearing (2) in a housing, and said eccentric shaft journal (8) being connected by a second needle roller bearing (9) to a movable part of a connecting structure. According to the invention, the outer ring of each needle roller bearing (2, 9) is made as a deep-drawn bushing (12, 13) which is shaped without chip removal and comprises rims (14, 15, 16, 17) on each side, the diameter d of the inner edge of the outer rims (14, 17) facing away from each other being smaller than the diameter D of the associated inner raceway. Due to this mirror-image arrangement of the two needle roller bearings (2, 9), an axial displacement of the shaft (1) is prevented when the fixed bearing (26) fails.

7 Claims, 3 Drawing Sheets

MOUNTING ARRANGEMENT FOR A SHAFT

FIELD OF THE INVENTION

The invention concerns an arrangement for mounting a shaft comprising a shaft journal arranged eccentric to a central longitudinal axis of the shaft on an end portion of the shaft, said end portion being supported by a first needle roller bearing in a housing, and said eccentric shaft journal being connected by a second needle roller bearing to a movable part of a connecting structure.

BACKGROUND OF THE INVENTION

An arrangement of the pre-cited type for mounting a shaft is known from SAE TECHNICAL PAPER SERIES No. 970113 "Improvement of Scroll Compressor for Vehicle Air Conditioning Systems". FIG. 6 of this prior art publication shows a schematic representation of a so-called scroll compressor. The guidance and support of is achieved by a fixed bearing arranged in the figure on the left and configured as a groove ball bearing which guides the shaft in axial direction, while an enlarged-diameter end portion of the shaft spaced from the ball bearing is held in a second bearing. This second bearing is configured as a needle roller bearing. This enlarged-diameter end portion continues into a shaft journal arranged eccentric to the central longitudinal axis of the shaft, said shaft journal being connected by a further needle roller bearing to an orbiting scroll of a scroll compressor.

A drawback of this construction, however, is that with an improperly functioning fixed bearing, the shaft can be displaced in axial direction. Either the eccentric shaft journal comes to abut against the orbiting scroll of the scroll compressor in one axial direction, or, in the other axial direction, the enlarged-diameter end portion of the shaft abuts against a surrounding housing part. In both cases, an undesired high wear occurs in this prior art mounting arrangement.

OBJECTS OF THE INVENTION

It is therefore an object of the invention to provide an improved arrangement for mounting a shaft with which wear within the mounting arrangement is avoided even when the fixed bearing is impaired in its function.

This and other objects and advantages of the invention will become obvious from the following detailed description.

SUMMARY OF THE INVENTION

The invention achieves the above objects by the fact that the outer ring of each needle roller bearing is made as a deep-drawn bushing which is shaped without chip removal and comprises an inner and an outer rim, the diameter d of the inner edge of the outer rims facing away from each other being smaller than the diameter D of the associated inner raceway.

Due to this mirror-image arrangement of the two needle roller bearings with their inwardly extending outer rims, the mounting arrangement of the shaft is fixed as a whole in axial direction, i.e. on failure of the fixed bearing, the eccentric shaft journal comes to bear against the inwardly extending rim of the second bearing, while the end face of the end portion of the shaft comes to bear against the inwardly extending rim of the first needle roller bearing. By virtue of this mirror-image arrangement of the two needle roller bearings configured according to the invention, a mounting arrangement having the function of a fixed bearing is created. The positive result of this is that if the actual fixed bearing fails, neither the housing nor the connecting structure can be damaged by an axial displacement of the shaft. This is an elegant solution for assuring an excellent protection of the mounting arrangement from wear.

According to an advantageous feature of the invention, the outer rims of the needle roller bearings facing away from each other and the shoulders of the end portion of the shaft and of the shaft journal are hardened. Thus, upon failure of the fixed bearing, the hardened end faces of the eccentric shaft journal and of the end portion of the shaft run against the likewise hardened rims of the needle roller bearings so that a reliable wear protection is realized.

According to another feature of the invention, the movable part of the connecting structure is a scroll of a scroll compressor and is pressed with its reception bore onto the bushing of the second needle roller bearing.

In a second embodiment, the invention achieves its objects by the fact that the outer ring of each needle roller bearing is made as a deep-drawn bushing which is shaped without chip removal and comprises an inner and an outer rim, and a stop disc or a stop ring is arranged between the needle crown ring and outer rims facing away from each other.

In this case, the axial positioning of the shaft is not realized by the rims but by the stop disc or stop ring. With this configuration, the radial dimension of the two opposing rims of the needle roller bearing does not have to extend inwards beyond the inner raceway diameter, but has only to be large enough so as to reliably retain the stop disc or the stop ring within the bearing arrangement.

According to a further feature of this embodiment of the invention, the stop disc or stop ring has a goffered structure oriented toward the eccentric shaft journal or the end portion. This goffered structure with its elevations and depressions has a better retention capacity for lubricant than a smooth surface.

According to still another feature of the second embodiment of the invention comprising a stop disc or a stop ring, the movable part of the connecting structure is again a scroll of a scroll compressor and is pressed with its reception bore onto the bushing of the second needle roller bearing.

Finally, according to a third embodiment, the invention achieves its objects by the fact that the outer ring of each needle roller bearing is made as a deep-drawn bushing which is shaped without chip removal and comprises an inner and an outer rim, a stop ring and a stop disc being arranged between the outer rims facing away from each other and the housing and the connecting structure respectively.

The invention will now be described more closely with the help of the following examples of embodiment.

DETAILED DESCRIPTION OF THE DRAWINGS

Figure 1:
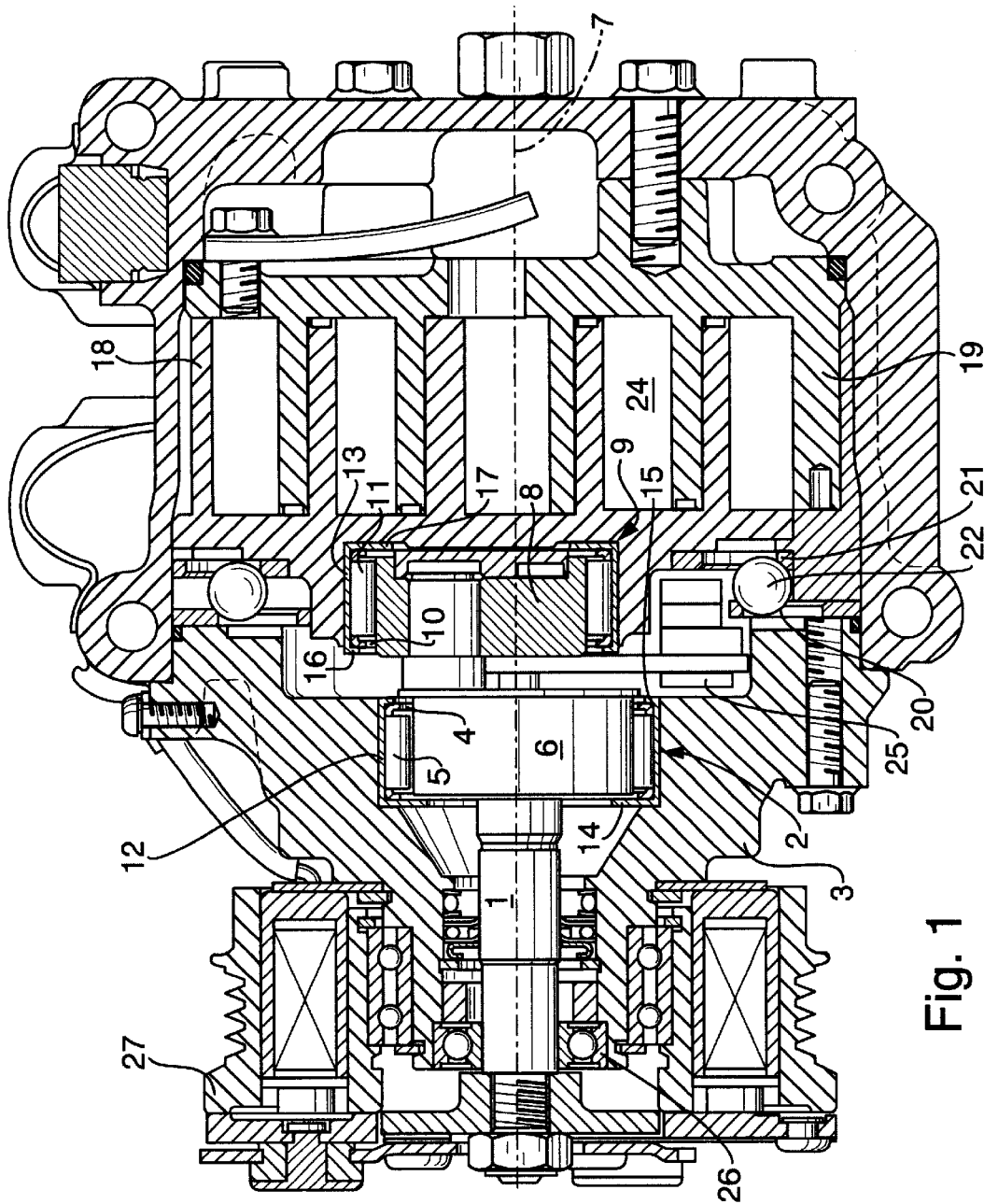
FIG. 1 is a longitudinal cross-section through a scroll compressor.

The scroll compressor shown in FIG. 1 comprises a shaft 1 which is provided with a belt pulley 27 and supported on two spaced-apart radial bearings 26, 2. The guidance of the shaft 1 in axial direction is achieved by the left-hand ball bearing 26 which is configured as a fixed bearing. The other radial bearing is configured as a first needle roller bearing 2 and lodged in a housing 3. The needle crown ring formed by needle rollers 5 guided in a cage 4 is arranged on an end portion 6 of the shaft 1 whose central longitudinal axis is identified at 7. The end portion 6 is directly followed by a shaft journal 8 which is arranged eccentric to the central longitudinal axis 7 and connected to the end portion 6. The outer peripheral surface of the shaft journal 8 forms the inner raceway of a second needle roller bearing 9. The out-of-balance created by the eccentric arrangement of the shaft journal 8 is compensated by balance weights 25.

The second needle roller bearing 9 likewise comprises a needle crown ring formed by needle rollers 11 guided in a cage 10. Each of the first and the second needle roller bearing 2, 9 comprises an outer ring which is a bushing shaped without chip removal and has inner and outer rims 14, 15, 16 and 17. The outer rims 14 and 17 of the needle roller bearings 2 and 9 facing away from each other are configured so that, as viewed in radial direction, they extend inwards beyond their associated inner raceways, i.e., as can best be seen in FIG. 2, the diameter d of the inner end of the outer rims 14, 17 facing away from each other is smaller than the diameter D of the associated inner raceway in each case. This mirror-image arrangement of the two needle roller bearings 2 and 9 assures an axial fixing of the shaft 1 when the fixed bearing 26 is inoperative. In an arrangement of the prior art, if the shaft 1 is displaced axially towards the left upon a failure of the fixed bearing 26, the end face of the end portion 6 would dig into the housing 3 and cause abrasive wear. In an arrangement of the invention, this is prevented by the bearing rim 14 which, as seen in radial direction, overlaps the end face of the end portion 6 of the shaft 1. On an axial displacement of the shaft 1 towards the left, the end face of the end portion 6 comes to bear against the lengthened bearing rim 14. If, upon a failure of the fixed bearing 26, the shaft 1 is displaced axially towards the right, a digging-in of the eccentric shaft journal 8 into the scroll 18 which is connected to the second needle roller bearing 9 is prevented by the outer bearing rim 17 which again extends radially inwards beyond the inner raceway of the second needle roller bearing 9. In this case, the end face of the eccentric shaft journal 8 comes to bear against the lengthened rim 17.

The movable scroll 18 of the scroll compressor, which is connected through the second needle roller bearing 9 to the shaft journal 8, is connected in a known manner to a fixed second scroll 19. The thrust bearing arrangement comprising the race washers 20 and 21 and the bearing balls 22 serves in a likewise known manner to axially support the movable scroll 18 which, due to pressure build-up in the compression chamber 24, tends to move towards the left. Besides this, the race washers 20, 21 which are provided with holes permit an eccentric movement of the movable scroll 18 but prevent an undesired rotation thereof.

Figure 2:
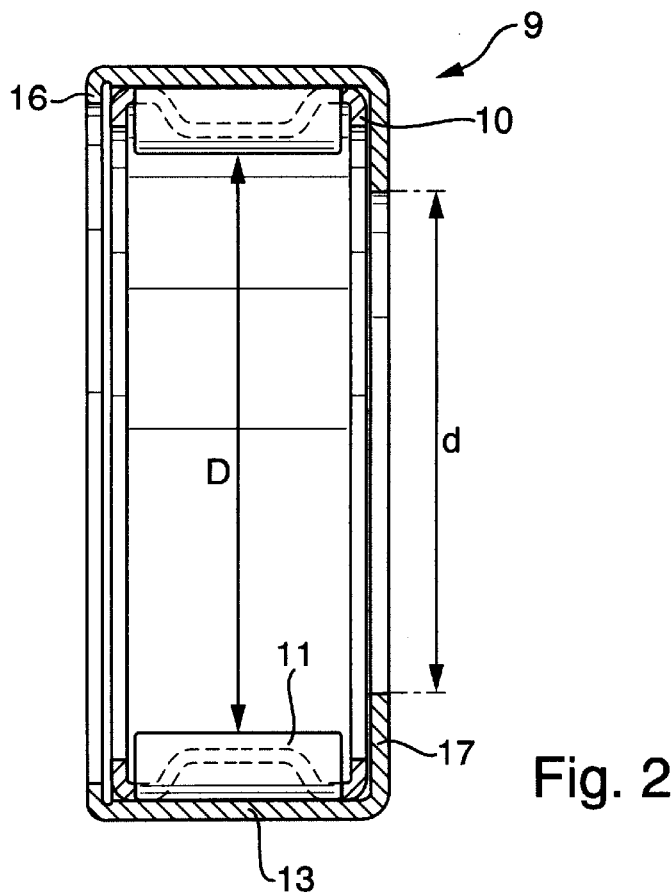
FIG. 2 is a longitudinal cross-section through a needle roller bearing of the invention.

FIG. 2 is an enlarged representation of the second needle roller bearing 9 which is arranged on the shaft journal 8 and carries the movable scroll 18. As can be clearly seen in this figure, the right-hand rim 17 of the chiplessly shaped bushing 13 is lengthened so that the diameter d of the inner end of the rim 17 is smaller than the diameter D of the inner raceway of the needle rollers 11. The outer rim 14 of the first needle roller bearing 2 is similarly configured.

Figure 3:
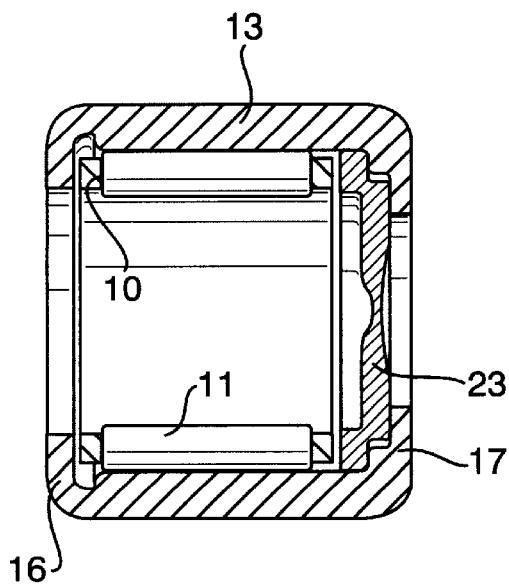
FIG. 3 is a longitudinal cross-section through a needle roller bearing of the invention comprising a stop disc.

As can be seen in FIG. 3, it is also possible to configure the second needle bearing 9 so that a stop disc 23 is arranged between the needle crown ring and the rim 17 of the bushing 13. Upon an axial displacement of the shaft 1 towards the right, the eccentric shaft journal 8 would run against this stop disc 23 and prevent a penetration of the shaft journal 8 into the scroll 18.

Figure 4:
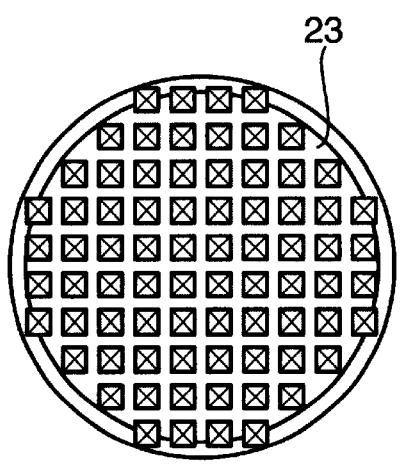
FIG. 4 is a top view of a stop disc.

FIG. 4 shows the goffered structure of the stop disc 23 with elevations and depressions, and this textured surface is oriented towards the end face of the shaft journal 8. Due to this texture, the stop disc 23 has an exceptionally good retention capacity for lubricant. An axial displacement of the shaft 1 in the opposite direction can be prevented in a similar manner by a corresponding configuration of the first needle roller bearing 2. In this case, a stop ring is arranged between the rim 14 and the needle crown ring. In both bearings, the outer rims 14, 17 may extend radially inwards beyond the inner raceway but they may also end above the inner raceway.

Figure 5:
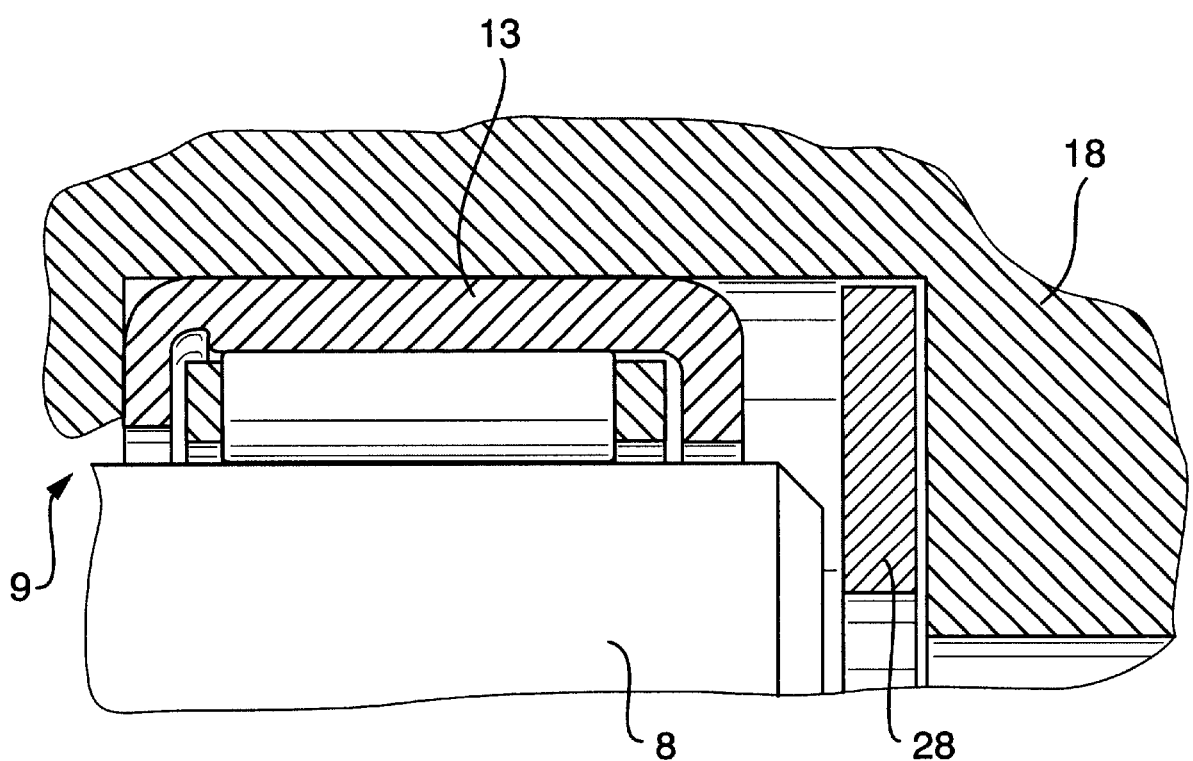
FIG. 5 is a partial longitudinal cross-section through a needle roller of the bearing comprising a stop ring.

Finally, FIG. 5 shows the right-hand, second needle roller bearing 9 configured according to the third embodiment of the invention. A stop ring 28 is arranged between the movable scroll 18 of the scroll compressor and the second needle roller bearing 9, and, upon an axial displacement of the shaft 1 towards the right, the end face of the shaft journal 8 runs against this stop ring 28. The first needle roller bearing 2 has an analogous configuration, i.e. a further stop ring 28 is arranged on the shaft 1, and, upon an axial displacement of the shaft 1 towards the left, the end face of the end portion 6 of the shaft 1 runs against this stop ring 28. It goes without saying that it is also possible to replace the right-hand stop ring 28 with a stop disc 23.

The invention is not restricted to the examples of embodiment described herein but rather, the inventive concept also includes combinations of individual features of the invention with one another. Thus, for example, the first needle roller bearing 2 may comprise an outer rim 14 which extends inwards beyond the inner raceway of the needle rollers 5, while the second needle roller bearing 9 may be configured as shown in FIG. 5, that is to say that a stop ring 28 may be arranged between the movable scroll 18 and the shaft journal 8.

What is claimed is:

1. An arrangement for mounting a shaft comprising a shaft journal arranged eccentric to a central longitudinal axis of the shaft on an end portion of the shaft, said end portion being supported by a first needle roller bearing in a housing, and said eccentric shaft journal being connected by a second needle roller bearing to a movable part of a connecting structure, characterized in that an outer ring of each of the first and the second needle roller bearing is made as a deep-drawn bushing which is shaped without chip removal and comprises an inner and an outer rim, a diameter d of an inner edge of said outer rims which face away from each other being smaller than a diameter D of an associated inner raceway.

2. An arrangement of claim 1 wherein said outer rims of the first and the second needle roller bearings which face away from each other and shoulders of the end portion of the shaft and shoulders of the shaft journal are hardened.

3. An arrangement of claim 1 wherein the movable part of the connecting structure is a scroll of a scroll compressor and is pressed with a reception bore onto the bushing of the second needle roller bearing.

4. An arrangement for mounting a shaft comprising a shaft journal arranged eccentric to a central longitudinal axis of the shaft on an end portion of the shaft, said end portion being supported by a first needle roller bearing in a housing, and said eccentric shaft journal being connected by a second needle roller bearing to a movable part of a connecting structure, characterized in that an outer ring of each of the first and the second needle roller bearing is made as a deep-drawn bushing which is shaped without chip removal and comprises an inner and an outer rim, and a stop disc or a stop ring is arranged between a needle crown ring and said outer rims which face away from each other.

5. An arrangement of claim 4 wherein the stop disc or stop ring has a goffered structure oriented toward the eccentric shaft journal or the end portion.

6. An arrangement of claim 4 wherein the movable part of the connecting structure is a scroll of a scroll compressor and is pressed with a reception bore onto the bushing of the second needle bearing.

7. An arrangement for mounting a shaft comprising a shaft journal arranged eccentric to a central longitudinal axis of the shaft on an end portion of the shaft, said end portion being supported by a first needle roller bearing in a housing, and said eccentric shaft journal being connected by a second needle roller bearing to a movable part of a connecting structure, characterized in that an outer ring of each of the first and the second needle roller bearing is made as a deep-drawn bushing which is shaped without chip removal and comprises an inner and an outer rim, a stop ring and a stop disc being arranged between said outer rims which face away from each other and the housing and the connecting structure respectively.

\* \* \* \* \*